US012080501B2

(12) United States Patent
Zhong et al.

(10) Patent No.: US 12,080,501 B2
(45) Date of Patent: Sep. 3, 2024

(54) HIGH-VOLTAGE DIRECT-CURRENT MAGNETIC LATCHING RELAY WITH SENSITIVE RESPONSE

(71) Applicant: Xiamen Hongfa Electric Power Controls Co., Ltd., Xiamen (CN)

(72) Inventors: Shuming Zhong, Xiamen (CN); Wenguang Dai, Xiamen (CN); Songsheng Chen, Xiamen (CN); Youquan Huang, Xiamen (CN)

(73) Assignee: Xiamen Mongfa Electric Power Controls Co., Ltd., Xiamen (CN)

( * ) Notice: Subject to any disclaimer, the term of this patent is extended or adjusted under 35 U.S.C. 154(b) by 0 days.

(21) Appl. No.: 18/253,824

(22) PCT Filed: Dec. 31, 2021

(86) PCT No.: PCT/CN2021/143729
§ 371 (c)(1),
(2) Date: May 22, 2023

(87) PCT Pub. No.: WO2022/151999
PCT Pub. Date: Jul. 21, 2022

(65) Prior Publication Data

US 2024/0006139 A1 Jan. 4, 2024

(30) Foreign Application Priority Data

Jan. 15, 2021 (CN) ......................... 202120118283.5

(51) Int. Cl.
*H01H 51/22* (2006.01)
*H01H 50/70* (2006.01)

(52) U.S. Cl.
CPC .................................. *H01H 50/70* (2013.01)

(58) Field of Classification Search
CPC ................ H01H 51/01; H01H 51/2202–5509
See application file for complete search history.

(56) References Cited

U.S. PATENT DOCUMENTS

2016/0035502 A1* 2/2016 Zhong ................ H01H 51/2209
335/170

FOREIGN PATENT DOCUMENTS

| | | | |
|---|---|---|---|
| CN | 102315053 A | 1/2012 | |
| CN | 203134717 U | 8/2013 | |

(Continued)

OTHER PUBLICATIONS

International Search Report for International Application No. PCT/CN2021/143729 mailed Mar. 14, 2022.

(Continued)

*Primary Examiner* — Ramon M Barrera
(74) *Attorney, Agent, or Firm* — Perilla Knox & Hildebrandt LLP; Kenneth A. Knox

(57) ABSTRACT

A high-voltage DC magnetic latching relay, including stationary contact lead-out terminals, a movable spring, a pushing rod component, and a direct-acting magnetic latching magnetic circuit structure including a movable iron core, a coil assembly, a stationary iron core, a yoke plate, a yoke cylinder and permanent magnets. The coil assembly is inside the yoke cylinder and provided with an iron core hole, the stationary iron core is provided in the iron core hole, the movable iron core is provided in the iron core hole and located between the yoke plate and the stationary iron core; the permanent magnets are mounted between the yoke plate and the coil assembly and positions thereof corresponds to a position of the movable iron core; a first spring is provided between the movable iron core and the stationary iron core, a second spring is provided between the movable iron core and the yoke plate.

12 Claims, 6 Drawing Sheets

(56) References Cited

FOREIGN PATENT DOCUMENTS

| | | | |
|---|---|---|---|
| CN | 205621664 | U | 10/2016 |
| CN | 207781500 | U | 8/2018 |
| CN | 214378266 | U | 10/2021 |
| JP | 2005056690 | A | 3/2005 |
| JP | 2017079108 | A | 4/2017 |

OTHER PUBLICATIONS

Notice of Allowance for JP Patent Application No. 2023-534903 of Jul. 9, 2024.

* cited by examiner

HIGH-VOLTAGE DIRECT-CURRENT MAGNETIC LATCHING RELAY WITH SENSITIVE RESPONSE

CROSS-REFERENCE TO RELATED APPLICATIONS

The present disclosure is a national phase application under 35 U.S.C. 371 of International Application No. PCT/CN2021/143729, filed on Dec. 31, 2021, which claims the benefit of and priority to Chinese Patent Application No. 202120118283.5, titled "Responsive High-Voltage DC Magnetic Latching Relay", filed on Jan. 15, 2021, the entire contents thereof are incorporated herein by reference.

TECHNICAL FIELD

The present disclosure relates to the technical field of relays and, in particular, to a responsive high-voltage DC magnetic latching relay.

BACKGROUND

A relay is an electronic control device, which has a control system (also called an input loop) and a controlled system (also called an output loop), and is usually used in automatic control circuits. The relay is actually a kind of "automatic switch" that uses a smaller current to control a larger current. Therefore, it plays a role in automatic adjustment, safety protection, and conversion circuit in the circuit. magnetic latching relay is a type of relay and is also an automatic switch. Like other electromagnetic relays, the magnetic latching relay acts as an automatic switch-on and switch-off for circuits. The difference is that the normally closed or normally open state of the magnetic latching relay is entirely dependent on the action of a permanent magnet, and the switching state of the magnetic latching relay is triggered by a pulsed electrical signal of a certain width.

A high-voltage DC magnetic latching relay in the related art typically includes two stationary contact lead-out terminals (i.e., the load side), a movable spring, a pushing rod component, and a direct-acting magnetic latching circuit structure. The top of the pushing rod component is mounted with a movable spring by means of a main spring, and the bottom of the pushing rod component is connected to a movable iron core of the direct-acting magnetic latching circuit structure. The direct-acting magnetic latching circuit structure includes a stationary iron core, a coil, a yoke cylinder, a yoke plate, and permanent magnets in addition to the movable iron core. The movable iron core and the stationary iron core are respectively adapted in the iron core hole, and the movable iron core is on the top and the stationary iron core is on the bottom. The yoke cylinder is wrapped around the bottom and the sides of the coil, the yoke plate is mounted above the coil and in contact with the sides of the yoke cylinder, and the two permanent magnets are mounted between the top of the coil corresponding to the winding window and the bottom of the yoke plate. In this type of high-voltage DC magnetic latching relay, the permanent magnet of the relay forms a bi-directional magnetic field loop in the open and closed states of the relay, and the magnetic field loop exerts a holding force on the movable iron core, thus enabling the relay to be held in the open or closed state. As the relay uses the driving force generated by the magnetic field of the permanent magnets to keep the contacts in the open or the closed state, this affects the sensitivity of the relay to close and open.

SUMMARY

According to one aspect of the present disclosure, a responsive high-voltage DC magnetic latching relay is provided. The relay including stationary contact lead-out terminals, a movable spring, a pushing rod component, and a direct-acting magnetic latching magnetic circuit structure; where, bottom ends of two stationary contact lead-out terminals are cooperated with two ends of the movable spring to achieve closing and opening of movable contacts and stationary contacts; the movable spring is mounted on a head of the pushing rod component by means of a main spring; the direct-acting magnetic latching magnetic circuit structure including a movable iron core, a coil assembly, a stationary iron core, a yoke plate, a yoke cylinder and permanent magnets; where, a bottom of the pushing rod component is fixedly connected to the movable iron core, the yoke plate is located underneath the head of the pushing rod component; the yoke cylinder is located below the yoke plate, the coil assembly is located inside the yoke cylinder, the coil assembly is provided with an iron core hole, the iron core hole is provided along a vertical direction, the stationary iron core is provided in the iron core hole and is located at a bottom end of the iron core hole, the movable iron core is provided in the iron core hole and is located between the yoke plate and the stationary iron core; the permanent magnets are mounted between the yoke plate and the coil assembly and positions of the permanent magnets corresponds to a position of the movable iron core in the vertical direction; where, a first spring is provided between the movable iron core and the stationary iron core, the first spring is configured to achieve a quick action of the relay, a second spring is provided between the movable iron core and the yoke plate, the second spring is configured to achieve a quick opening of the relay.

According to exemplary embodiments of the present disclosure, the first spring is configured to act between the movable iron core and the stationary iron core and to cause a predetermined first gap to exist between the movable iron core and the stationary iron core when the movable contacts and the stationary contacts are opened, so that a first magnetic levitation air gap is formed in a lower magnet loop passing through the movable iron core and the stationary iron core.

According to exemplary embodiments of the present disclosure, a lower end of the movable iron core is provided with a first lower groove which is depressed upwardly, and an upper end of the stationary iron core is provided with a first upper groove which is depressed downwardly, and the first spring is a pressure spring, and an upper end and a lower end of the first spring are adapted in the first lower groove of the movable iron core and the first upper groove of the stationary iron core, respectively.

According to exemplary embodiments of the present disclosure, the first spring is a tower spring, and a radial dimension of the first spring increases in a gradual manner from top to bottom.

According to exemplary embodiments of the present disclosure, the coil assembly is provided with a convex edge inside, the convex edge is configured to project inwardly from an inner side of a hole wall of the iron core hole to inside of the iron core hole, an outer peripheral wall of the stationary iron core is provided with a step, a step surface of the step is configured to face the movable iron core, and the step of the stationary core is adapted to the convex edge of the coil assembly so that the stationary iron core is confined within the iron core hole of the coil assembly.

According to exemplary embodiments of the present disclosure, the second spring is configured to act between the movable iron core and the yoke plate, and when the movable contacts and stationary contacts are closed, a predetermined second gap is existed between the movable iron core and the yoke plate, thereby forming a second magnetic levitation air gap in a magnet loop passing through the movable iron core and the yoke plate; an elastic force of the second spring is less than an elastic force of the first spring.

According to exemplary embodiments of the present disclosure, an upper end of the movable iron core is provided with a second upper groove which is depressed downwardly, and a lower end of the yoke plate is provided with a second lower groove which is depressed upwardly, the second spring is a pressure spring, and an upper end and an lower end of the second spring are adapted in the second lower groove of the yoke plate and the second upper groove of the movable iron core, respectively.

According to exemplary embodiments of the present disclosure, the permanent magnets are provided at a position corresponding to an upper part of the movable iron core in the vertical direction.

According to exemplary embodiments of the present disclosure, the permanent magnets are provided at a position corresponding to a middle part of the movable iron core in the vertical direction.

According to exemplary embodiments of the present disclosure, the permanent magnets are provided at a position corresponding to a lower part of the movable iron core in the vertical direction.

According to exemplary embodiments of the present disclosure, the pushing rod component includes a pushing rod provided with a head, the pushing rod is configured to extend downwardly from the head and pass through the yoke plate and is fixedly connected to the movable iron core below the yoke plate.

According to exemplary embodiments of the present disclosure, the pushing rod and the movable iron core are fixed by threaded connection or laser welding.

The present disclosure will be further described in detail below with reference to the accompanying drawings and embodiments. However, the responsive high-voltage DC magnetic latching relay of the present disclosure is not limited to the embodiments.

DETAILED DESCRIPTION

Figure 1:
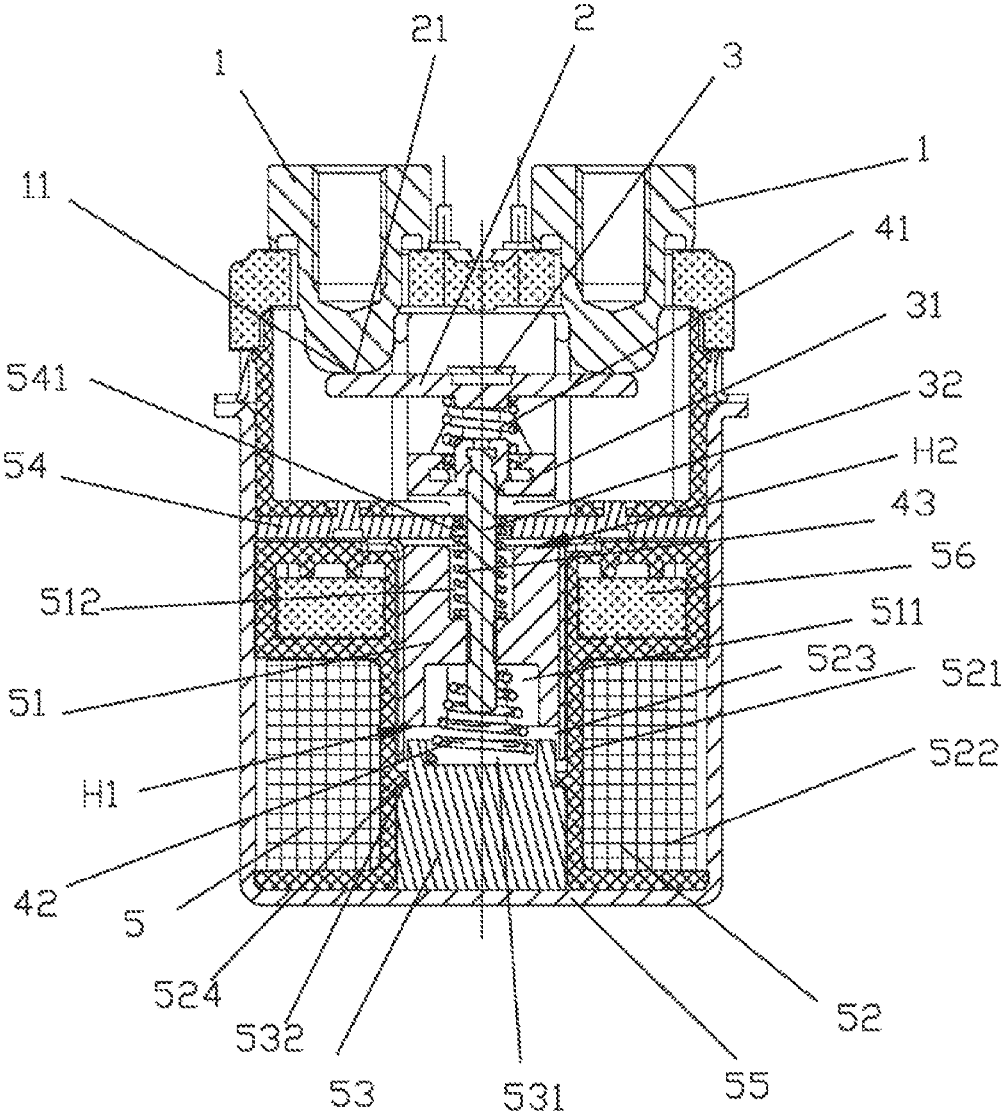
FIG. 1 is a schematic diagram of the structure of the relay of embodiments of the present disclosure (dissected along the extended direction of the line connecting the two stationary contact lead-out terminals).

Referring to FIGS. 1 to 6, a responsive high-voltage DC magnetic latching relay of the present disclosure is shown that includes stationary contact lead-out terminals 1, a movable spring 2, a pushing rod component 3, and a direct-acting magnetic latching magnetic circuit structure 5. Bottom ends 11 (as stationary contacts) of the two stationary contact lead-out terminals 1 are cooperated with the two ends 21 of the movable spring 2 (as movable contacts) to achieve the closing and opening of the movable contacts and the stationary contacts. The movable spring 2 is mounted on the head of the pushing rod component 3 by means of the main spring 41. The direct-acting magnetic latching magnetic circuit structure 5 includes a movable iron core 51, a coil assembly 52, a stationary iron core 53, a yoke plate 54, a yoke cylinder 55, and permanent magnets 56. The bottom of the pushing rod component 3 is fixedly connected to the movable iron core 51. The coil assembly 52 includes a bobbin 521 and enameled wires 522. The yoke plate 54 is located underneath the head 31 of the pushing rod component 3. The yoke cylinder 55 is located below the yoke plate 54, the coil assembly 52 is located inside the yoke cylinder 55, the coil assembly 52 is provided with an iron core hole 523 inside the bobbin 521, and the iron core hole 523 is provided along the vertical direction. The stationary iron core 53 is fixedly provided in the iron core hole 523 of the coil assembly 52 and is located at the bottom end of the iron core hole 523, and the movable iron core 51 is provided in the iron core hole 523 and is located between the yoke plate 54 and the stationary iron core 53. The permanent magnets 56 are mounted between the yoke plate 54 and the coil assembly 52 and the positions of the permanent magnets 56 correspond to the position of the movable iron core 51 in the vertical direction. A first spring 42 is provided between the movable iron core 51 and the stationary iron core 53, and the first spring 42 is configured to achieve fast close of the relay, i.e., to achieve fast close of the stationary contact lead-out terminals 1 and the movable spring 2. A second spring 43 is provided between the movable iron core 51 and the yoke plate 54, and the second spring 43 is configured to achieve a quick opening of the relay, i.e., to achieve a quick disconnection of the stationary contact lead-out terminals 1 and the movable spring 2.

Figure 3:
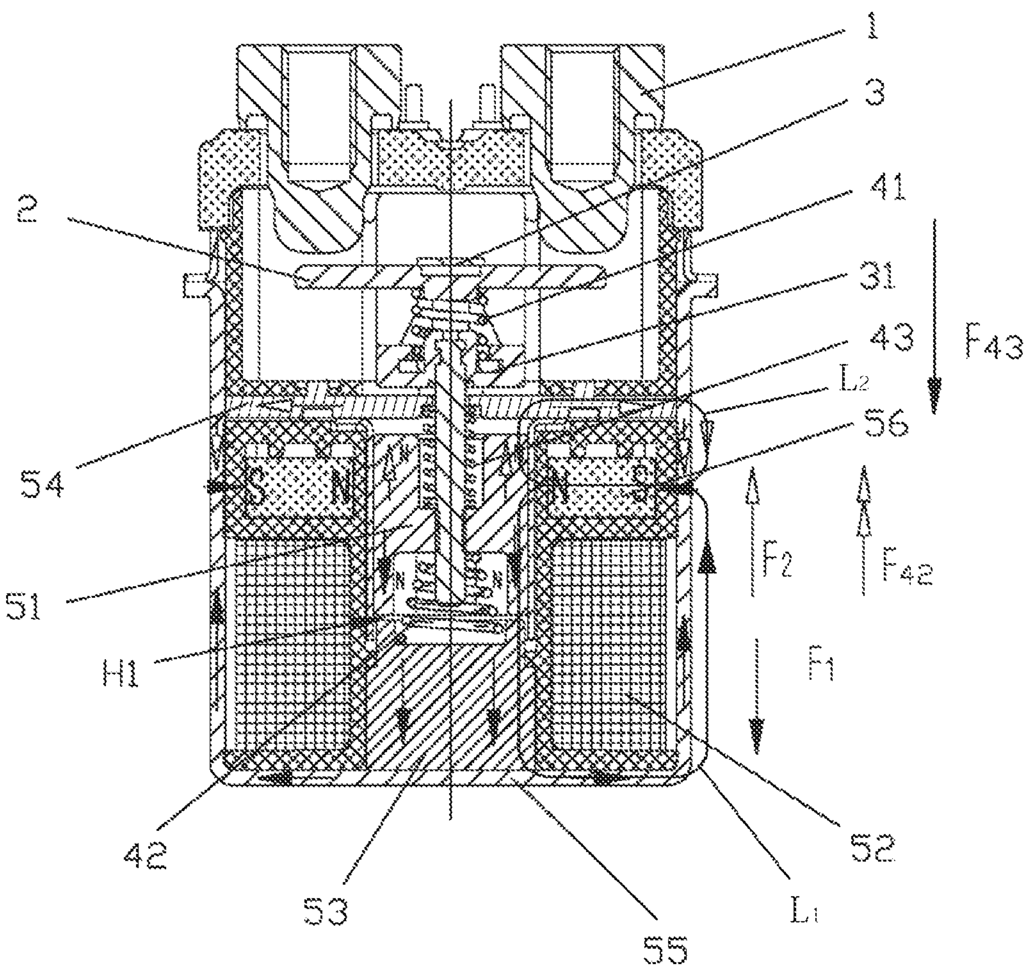
FIG. 3 is a schematic diagram of the magnetic field loop and the state of the generated force values of the relay of embodiments of the present disclosure in the open state.

It is to be noted that, as shown in FIGS. 3 to 6, the N pole of the permanent magnet 56 of the embodiments of the present disclosure is configured to face the side of the movable iron core 51. As shown in FIG. 3, because the permanent magnet 56 is itself magnetic and has its own magnetic loop from the N pole and returns to the S pole from above or below around its exterior, the magnetic circuit will magnetize the movable iron core 51, the stationary iron core 53, and the yoke iron cylinder 55. As shown in FIG. 3, there are four "N" marks on the movable iron core 51, indicating that it is magnetized. Thus, as shown in FIG. 3, a lower magnet loop $L_1$ is formed due to the magnetism of the permanent magnet 56, and the lower magnet loop $L_1$ is configured to start at the N pole of the permanent magnet 56, pass through the movable iron core 51, the stationary iron core 53, and the yoke cylinder 55, and return to the S pole. Also, at the same time, an upper magnet loop $L_2$ is formed, which is configured to start from the N pole of the permanent magnet 56, pass through the movable iron core 51, the yoke plate 54, and the yoke cylinder 55, and return to the S pole.

In the embodiment, as shown in FIG. 3, the first spring 42 is configured to act between the movable iron core 51 and the stationary iron core 53 and to cause a predetermined first gap to exist between the movable iron core 51 and the stationary iron core 53 when the movable contacts and stationary contacts are opened, i.e., when the bottom ends 11 of the stationary contact lead-out terminals 1 are disconnected from the movable spring 2, thus, a first magnetic levitation air gap H1, i.e., the lower magnetic levitation air gap, is formed in the lower magnet loop passing through the movable iron core 51 and the stationary iron core 53. That is, when the movable contacts and stationary contacts are closed, there is an air gap between the lower end of the movable iron core 51 and the upper end of the stationary iron core 53. When the movable contacts and stationary contacts are opened, the movable iron core 51 moves downward and the air gap is constantly reduced. When the movable iron core 51 moves down to the lowest position, there is still an air gap between the movable iron core 51 and the stationary iron core 53, and the air gap at this time is the above described first gap, i.e., the first magnetic levitation air gap H1. By providing this first magnetic levitation air gap H1, collisions between the movable iron core 51 and the stationary iron core 53 can be avoided when the movable iron core 51 moves downward, and noise can be reduced, and the size of this first magnetic levitation air gap H1 in the vertical direction is greatly reduced, which reduces its magnetoresistance and ensures the quick action of the relay. In the embodiment, as shown in FIG. 1, the lower end of the movable iron core 51 is provided with a first lower groove 511 which is depressed upwardly, and the upper end of the stationary iron core 53 is provided with a first upper groove 531 which is depressed downwardly. The first spring 42 is a pressure spring, and the upper and lower ends of the first spring 42 are adapted in the first lower groove 511 of the movable iron core 51 and the first upper groove 531 of the stationary iron core 53, respectively.

In the embodiment, as shown in FIG. 1, the first spring 42 is a tower spring, and the radial dimension of the first spring 42 increases in a gradual manner from top to bottom. The use of the tower spring (variable K value, K is the spring stiffness coefficient) can further shorten the action time of the product, realize the quick action of the product, and be more responsive to meet the requirements of different customers for the action time of the product.

In the embodiment, as shown in FIG. 1, the bobbin 521 of the coil assembly 52 is provided with a convex edge 524 which projects inwardly from the inner side of the hole wall of the iron core hole 523, i.e., projects towards the center of the iron core hole 523. The stationary iron core 53 is provided with a step 532 on the outer peripheral wall, the step surface of the step 532 facing the movable iron core 51, and the step 532 of the stationary core 53 is adapted to the convex edge 524 of the coil assembly 52 so that the stationary iron core 53 is confined within the iron core hole 523 of the coil assembly 52.

Figure 5:
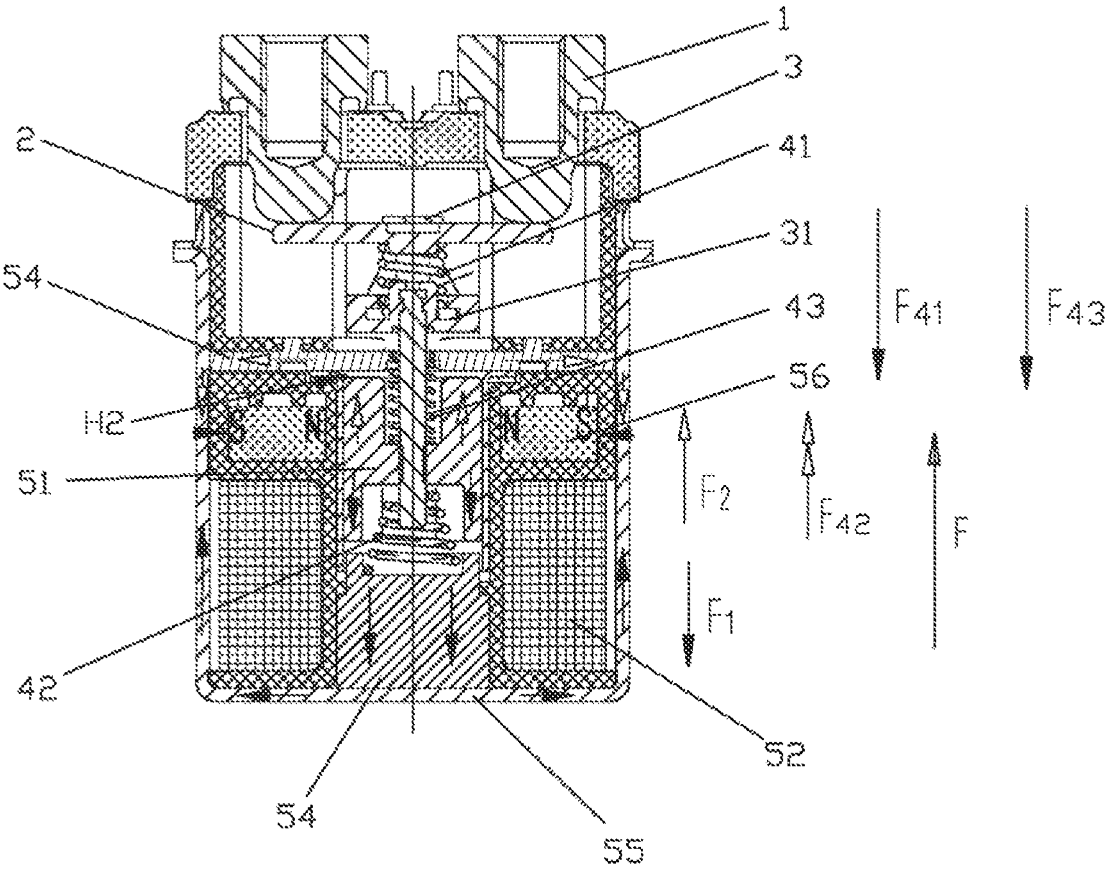
FIG. 5 is a schematic diagram of the magnetic field loop and the state of the generated force values of the relay of embodiments of the present disclosure in the closed state.

In the embodiment, as shown in FIG. 5, the second spring 43 is configured to act between the movable iron core 51 and the yoke plate 54, and when the movable contacts and stationary contacts are closed, i.e., when the bottom ends 11 of the stationary contact lead-out terminals 1 is in closed contact with the movable spring 2, a predetermined second gap exists between the movable iron core 51 and the yoke plate 54, thereby forming a second magnetic levitation air gap H2, i.e., an upper magnetic levitation air gap, in the upper magnet loop passing through the movable iron core 51 and the yoke plate 54. Specifically, when the stationary contacts and movable contacts are in the open state, there is an air gap between the upper end of the movable iron core 51 and the lower end of the yoke plate 54. When the stationary contacts and movable contacts tend to close, the movable iron core 51 moves upwardly and the air gap decreases. When the movable iron core 51 moves upward to the highest position, there is still an air gap between the movable iron core 51 and the yoke plate 54, and the air gap at this time is the second gap described above, i.e., the second magnetic levitation air gap H2. By providing the second magnetic levitation air gap H2, collisions between the movable iron core 51 and the yoke plate 54 can be avoided when the movable iron core 51 moves upwardly, noise can be reduced, and the size of the second magnetic levitation air gap H2 in the vertical direction is greatly reduced, which reduces its magnetoresistance and ensures the quick action of the relay. In the closed state of the movable contacts and the stationary contacts, the elastic force of the second spring 43 is less than the elastic force of the first spring 42.

In the embodiment, as shown in FIG. 1, the movable iron core 51 is provided with a second upper groove 512 depressed downward at the upper end, and the yoke plate 54 is provided with a second lower groove 541 depressed upward at the lower end. The second spring 43 is a pressure spring, and the upper and lower ends of the second spring 43 are adapted in the second lower groove 541 of the yoke plate 54 and the second upper groove 512 of the movable iron core 51, respectively.

Figure 2:
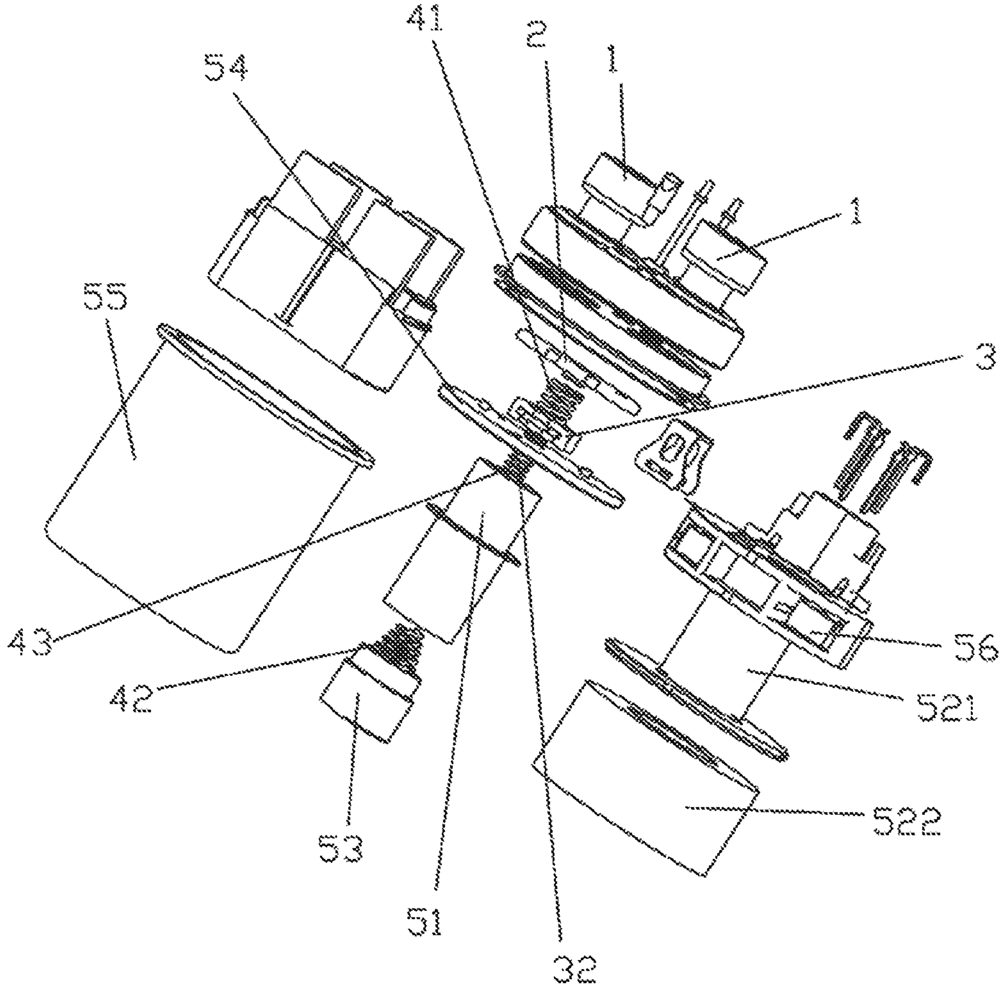
FIG. 2 is an exploded perspective schematic diagram of the relay of the embodiments of the present disclosure.

In the embodiment, as shown in FIG. 1, the permanent magnets 56 are provided at a position corresponding to the upper part of the movable iron core 51 in the vertical direction. Specifically, as shown in FIGS. 1 and 2, the permanent magnets 56 are mounted on top of the bobbin 521 between the yoke plate 54 and the enameled wires 522 of the coil assembly 52. The number of the permanent magnets 56 is two, and the two permanent magnets 56 are located at positions corresponding to the two ends of the movable spring 2 along its length direction, i.e., under the two ends of the movable spring 2 capable of contacting the two stationary contact lead-out terminals 1. As shown in FIGS. 2 to 6, the two permanent magnets have the same polarity on two opposite sides, in the embodiment, the polarity of the opposite sides of the two permanent magnets 56 is N pole. Arranging the permanent magnets 56 at a position corresponding to the upper part of the movable iron core 51 in the vertical direction allows the closed holding force of the relay to be greater than the open holding force. The closed holding force of the relay is the force that keeps the movable contacts and the stationary contacts in the closed state, and the open holding force of the relay is the force that keeps the movable contacts and the stationary contacts in the open state. Of course, the permanent magnets 56 can be also arranged at a position corresponding to the middle part of the movable iron core 51 in the vertical direction, as needed, in a configuration that makes the closed holding force of the relay is similar to the open holding force. Of course, it is also possible to arrange the permanent magnets 56 at a position corresponding to the lower part of the movable iron core 51, as needed, a configuration that makes the closed holding force of the relay less than the open holding force. The offset arranging of the permanent magnets not only solves the problem of large difference between the operation voltage and reversion voltage values of the product, but also ensures that the difference between the open holding force and the closed holding force of the product is stable within a certain range. Moreover, the similar action time and release time of the product can be realized, and the product is more stable. The position of the magnet offset has a different effect on the electrical parameters of the product and the value of the open and close holding force. Therefore, the magnetic latching relays of the present disclosure can be adjusted according to the customer's needs for product force values and electrical parameters.

In the embodiment, as shown in FIG. 1, the pushing rod component 3 includes a pushing rod 32 provided with a head 31. The pushing rod 32 is configured to extend downwardly from its head 31 and pass through the yoke plate 54 and is fixedly connected to the movable iron core 51 below the yoke plate 54. The pushing rod 32 and the movable iron core 51 can be fixed by a threaded connection or by laser welding. The threaded connection has the characteristics of simple assembly and high efficiency, and the secondary fixing of the pushing rod 32 and the movable iron core 51 can be realized in the form of injecting glue on the side of the movable iron core 51 or making a hole in the yoke plate 54 to inject glue. With the above-mentioned laser welding, the pushing rod 32 can have only a rod, which can further ensure concentricity and achieve high reliability of the product as well as action sensitivity.

Referring to FIG. 3, in the open state of the relay, a lower magnet loop $L_1$ passing through the movable iron core 51, the first magnetic levitation air gap H1, the stationary iron core 53, and the yoke cylinder 55 is formed due to the permanent magnets 56 having magnetism, as shown by the arrow with black fill in FIG. 3, and an upper magnet loop $L_2$ passing through the movable iron core 51, the air gap, the yoke plate 54, and the yoke cylinder 55 is formed, as shown by the arrow not having a fill in FIG. 3. In the lower magnet loop $L_1$, the movable iron core 51, the stationary iron core 53 and the yoke cylinder 55 will be subjected to a downward force $F_1$ in the vertical direction, and in the upper magnet loop $L_2$, the movable iron core 51, the yoke plate 54, and the yoke cylinder 55 will be subjected to an upward force $F_2$ in the vertical direction. The first magnetic levitation air gap H1 of the lower magnet loop $L_1$ is very small, making its magnetoresistance very small, and the force value $F_1$ generated by the lower magnet loop $L_1$ is much larger than the force value $F_2$ generated by the upper magnet loop $L_2$, so that the join force value $F=F_1+F_{43}-F_2-F_{42}>0$ in the vertical direction. $F_{43}$ represents the elastic force generated by the second spring 43, the direction of the elastic force is downward, $F_{42}$ represents the elastic force generated by the first spring 42, the direction of the elastic force is upward, the elastic force $F_{42}$ generated by the first spring 42 is much smaller than the force $F_1$ generated by the lower magnet loop circuit $L_1$, the join force is downward, and the product remains open.

Figure 4:
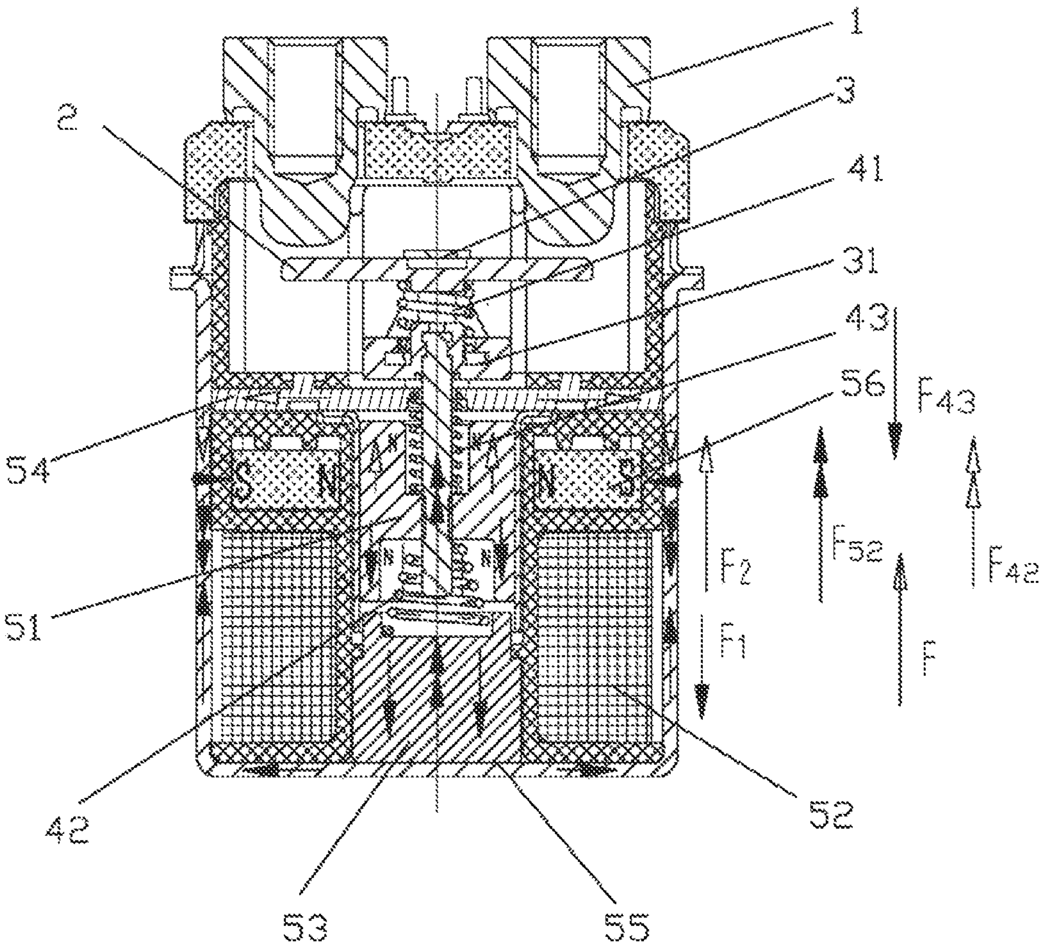
FIG. 4 is a schematic diagram of the state of the contacts closure process when the relay of the embodiments of the present disclosure is applied with positive energization.

Referring to FIG. 4, when a positive energization is applied to the coil assembly, because the permanent magnet 56 has magnetism, the lower magnet loop circuit $L_1$ passing through the movable iron core 51, the stationary iron core 53, and the yoke cylinder 55 is still formed, as shown by the arrow with black filling in FIG. 4, and the force value $F_1$ is generated, and an upper magnet loop $L_2$ passing through the movable iron core 51, the yoke plate 54, and the yoke cylinder 55 is formed, as shown by the arrow not having fill in FIG. 4, and the force value $F_2$ is generated. The coil assembly 52 is applied with positive energization generating a magnetic field loop opposite to the lower magnet loop $L_1$, so that the coil assembly 52 generates a force $F_{52}$ opposite to $F_1$, with the aim of counteracting $F_1$ generated by the lower magnet loop $L_1$. Note in particular that the force value $F_{52}$ generated by the coil assembly only has an effect at the moment of counteracting $F_1$ and does not provide an upward force at other times. Therefore, the join force in the vertical direction $F=F_2+F_{42}-F_{43}>0$, the direction of the join force is upward, so that the pushing rod component 3 and the movable iron core 51 moves upwardly.

As shown in FIG. 5, in the closed state of the relay, due to the permanent magnet has magnetism, the lower magnet loop circuit $L_1$ passing through the movable iron core 51, the air gap, the stationary iron core 53, and the yoke cylinder 55 is formed, as shown by the arrow with black filling in FIG. 5, and the upper magnet loop $L_2$ passing through the movable iron core 51, the second magnetic levitation air gap H2, the yoke plate 54, and the yoke cylinder 55 is formed, as shown by the arrow not having fill in FIG. 5. The second magnetic levitation air gap H2 of the upper loop $L_2$ is much smaller than the air gap, a force value $F_2$ generated by the upper magnet loop $L_2$ is much larger than the force value $F_1$ generated by the lower magnet loop $L_1$. Therefore, the value of the join force in the vertical direction $F=F_2+F_{42}-F_{43}-F_{41}-F_1>0$, the direction of the join force is upward and thus the relay remains closed; where, $F_{41}$ is the force of the main spring 41 acting on the pushing rod component 3 and the force acting on the movable iron core 51, in the closed state, the main spring 41 is in the stretched state, and the direction of $F_{41}$ is downward.

Figure 6:
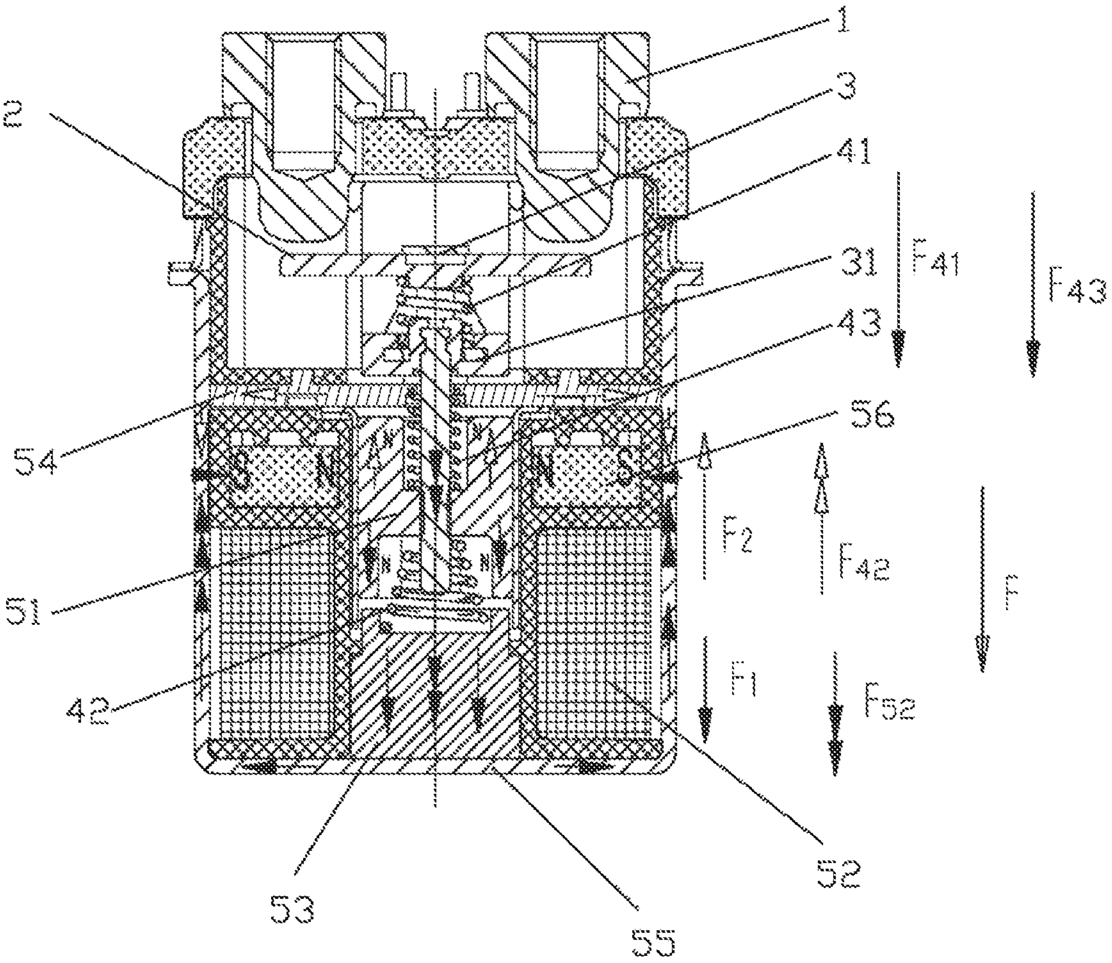
FIG. 6 is a schematic diagram of the state of the contacts open process when the relay of the embodiments of the present disclosure is applied with negative energization.

As shown in FIG. 6, when a negative energization is applied to the coil assembly, because the permanent magnet 56 has magnetism, the lower magnet loop circuit $L_1$ passing through the movable iron core 51, the stationary iron core 53, and the yoke cylinder 55 is still formed, as shown by the arrow with black filling in FIG. 6, and the force value $F_1$ is generated, and an upper magnet loop $L_2$ passing through the movable iron core 51, the yoke plate 54, and the yoke cylinder 55 is formed, as shown by the arrow not having fill in FIG. 6, and the force value $F_2$ is generated. The coil assembly 52 is applied with negative energization generating a magnetic field loop opposite to the upper magnet loop $L_2$, so that the coil assembly 52 generates a force $F_{52}$ opposite to $F_2$, with the aim of counteracting $F_2$ generated by the upper magnet loop $L_2$. The force value $F_{52}$ generated by the coil assembly only has an effect at the moment of counteracting $F_1$ and does not generate the force at other times. The downward force $F_1$ generated by the lower magnet loop $L_1$ and the downward force $F_{41}$ generated by the main spring 41 act on the movable iron core 51. The join force value $F=F_1+F_{41}+F_{43}-F_{42}$, the movable contacts and stationary contacts quickly opened, that is, the movable spring 2 and stationary contact lead-out terminals 1 quickly disconnected.

The lower magnet loop circuit $L_1$, the upper magnet loop $L_2$ and the magnetic field loops generated when the coil assembly 52 are energized as described above are magnet loops.

In the responsive high-voltage DC magnetic latching relay of the embodiments of the present disclosure, the first spring 42 is provided between the movable iron core 51 and the stationary iron core 53 to achieve quick action of the relay, the second spring 43 is provided between the movable iron core 51 and the yoke plate 54 for quick opening of the relay. The structure of the latching relay of the present disclosure makes a predetermined gap generated between pole faces of the movable iron core 51 and the stationary iron core 53 opposite to each other when the movable spring 2 is disconnected from the stationary contact lead-out terminals 1, by utilizing the first spring 42 between the movable iron core 51 and the stationary iron core 53. Thus, the first magnetic levitation air gap H1 is formed in the lower magnet loop $L_1$ passing through the movable iron core 51 and the stationary iron core 53, which realizes a quick action of the product and ensures the quick action of the product, so that the open holding force of the relay is as small as possible while satisfying the vibration shock resistance of the product, and at the same time reducing noise during contact between the movable iron core 51 and the stationary iron core 53. By adopting the second spring 42 between the movable iron core 51 and the yoke plate 54, when the movable spring 2 and the stationary contact lead-out terminals 1 are closed, a predetermined gap is existed between the movable iron core 51 and the yoke plate 54, thereby forming a second magnetic levitation air gap H2 in the upper magnet loop $L_2$ passing through the movable iron core 51 and the yoke plate 54. The spring force value when the product opens is the force value of the main spring 41, the first spring 42 and the second spring 43 acting together to achieve a quick opening of the product. A double spring structure is used in the present disclosure for physical contact magnetic isolation, so that the product structure is stable, meanwhile, the upper and lower magnet loops form magnetic levitation air gaps, which can optimize the action voltage, action time, release voltage and release time to achieve a more responsive product.

The contents described above are merely various embodiments of the present disclosure and are not intended to limit the present disclosure in any way. Although the present disclosure has been disclosed as described above in accordance with various embodiments, it is not intended to limit the present disclosure. A person skilled in the art can make many possible variations and modifications to the technical solutions of this disclosure, or modify them to equivalent embodiments of equivalent assimilation, using the technical content revealed above, without departing from the scope of the technical solutions of this disclosure. Therefore, any simple modifications, equivalent changes and modifications made to the above embodiments based on the technical substance of the present disclosure without departing from the content of the technical solutions of the present disclosure shall fall within the scope of protection of the technical solutions of the present disclosure.

What is claimed is:

1. A high-voltage DC magnetic latching relay, comprising:

stationary contact lead-out terminals, a movable spring, a pushing rod component, and a direct-acting magnetic latching magnetic circuit structure;

wherein bottom ends of two stationary contact lead-out terminals are cooperated with two ends of the movable spring to achieve closing and opening of movable contacts and stationary contacts, the movable spring is mounted on a head of the pushing rod component by means of a main spring; the direct-acting magnetic latching magnetic circuit structure comprising a movable iron core, a coil assembly, a stationary iron core, a yoke plate, a yoke cylinder, and permanent magnets;

wherein a bottom of the pushing rod component is fixedly connected to the movable iron core, the yoke plate is located underneath the head of the pushing rod component, the yoke cylinder is located below the yoke plate, the coil assembly is located inside the yoke cylinder, the coil assembly is provided with an iron core hole, the iron core hole is provided along a vertical direction, the stationary iron core is provided in the iron core hole and is located at a bottom end of the iron core hole, and the movable iron core is provided in the iron core hole and is located between the yoke plate and the stationary iron core;

wherein the permanent magnets are mounted between the yoke plate and the coil assembly and positions of the permanent magnets corresponds to a position of the movable iron core in the vertical direction; and wherein a first spring is provided between the movable iron core and the stationary iron core, the first spring is configured to achieve a quick action of the relay, a second spring is provided between the movable iron core and the yoke plate, and the second spring is configured to achieve a quick opening of the relay.

2. The high-voltage DC magnetic latching relay of claim 1, wherein the first spring is configured to act between the movable iron core and the stationary iron core and to cause a predetermined first gap to exist between the movable iron core and the stationary iron core when the movable contacts and the stationary contacts are opened, so that a first magnetic levitation air gap is formed in a lower magnet loop passing through the movable iron core and the stationary iron core.

3. The high-voltage DC magnetic latching relay of claim 2, wherein a lower end of the movable iron core is provided with a first lower groove which is depressed upwardly, and an upper end of the stationary iron core is provided with a first upper groove which is depressed downwardly, and the first spring is a pressure spring, and an upper end and a lower end of the first spring are adapted in the first lower groove of the movable iron core and the first upper groove of the stationary iron core, respectively.

4. The high-voltage DC magnetic latching relay of claim 3, wherein the first spring is a tower spring, and a radial dimension of the first spring increases in a gradual manner from top to bottom.

5. The high-voltage DC magnetic latching relay of claim 1, wherein the coil assembly is provided with a convex edge inside, the convex edge is configured to project inwardly from an inner side of a hole wall of the iron core hole to inside of the iron core hole, an outer peripheral wall of the stationary iron core is provided with a step, a step surface of the step is configured to face the movable iron core, and the step of the stationary core is adapted to the convex edge of the coil assembly so that the stationary iron core is confined within the iron core hole of the coil assembly.

6. The high-voltage DC magnetic latching relay of claim 2, wherein the second spring is configured to act between the movable iron core and the yoke plate, and when the movable contacts and stationary contacts are closed, a predetermined second gap is existed between the movable iron core and the yoke plate, thereby forming a second magnetic levitation air gap in an upper magnet loop formed by the permanent magnets and passing through the movable iron core and the yoke plate; an elastic force of the second spring is less than an elastic force of the first spring.

7. The high-voltage DC magnetic latching relay of claim 6, wherein an upper end of the movable iron core is provided with a second upper groove which is depressed downwardly, and a lower end of the yoke plate is provided with a second lower groove which is depressed upwardly, the second spring is a pressure spring, and an upper end and an lower end of the second spring are adapted in the second lower groove of the yoke plate and the second upper groove of the movable iron core, respectively.

8. The high-voltage DC magnetic latching relay of claim 1, wherein the permanent magnets are provided at a position corresponding to an upper part of the movable iron core in the vertical direction.

9. The high-voltage DC magnetic latching relay of claim 1, wherein the permanent magnets are provided at a position corresponding to a middle part of the movable iron core in the vertical direction.

10. The high-voltage DC magnetic latching relay of claim 1, wherein the permanent magnets are provided at a position corresponding to a lower part of the movable iron core in the vertical direction.

11. The high-voltage DC magnetic latching relay of claim 1, wherein the pushing rod component comprises a pushing rod provided with a head, and the pushing rod is configured to extend downwardly from the head and pass through the yoke plate and is fixedly connected to the movable iron core below the yoke plate.

12. The high-voltage DC magnetic latching relay of claim 11, wherein the pushing rod and the movable iron core are fixed by threaded connection or laser welding.

* * * * *